United States Patent

Hughes

[15] 3,637,002

[45] Jan. 25, 1972

[54] AUTOMOBILE TIRE VALVE ADAPTER

[72] Inventor: George W. Hughes, 2601 Mills St., Houston, Tex. 77026

[22] Filed: July 2, 1969

[21] Appl. No.: 838,576

[52] U.S. Cl. ............................................. 152/429
[51] Int. Cl. ........................................... B60c 29/00
[58] Field of Search ..................... 137/223, 231, 232, 333; 152/195, 349, 350, 427, 428, 429, 430, 430 R

[56] References Cited

UNITED STATES PATENTS

| | | | |
|---|---|---|---|
| 2,687,761 | 8/1954 | Marick | 152/349 |
| 2,928,447 | 3/1960 | Hosking | 152/427 |
| 2,928,449 | 3/1960 | Hosking | 152/427 |
| 3,442,316 | 5/1969 | McMaster | 152/427 |
| 3,510,929 | 5/1970 | Kilmarx | 152/427 |

Primary Examiner—Richard E. Aegerter
Assistant Examiner—I. Kenneth Silverman
Attorney—Ranseler O. Wyatt

[57] ABSTRACT

A pneumatic tire valve adapter to be mounted on the valve stem extending from an inner tube, and having a flexible valve stem mounted on said inner tube valve stem, and having a peripheral groove at the bottom thereof adapted to be received by the edge of the valve stem orifice in the vehicle wheel, to seal the annulus between the inner tube and casing, and a valve core in each of said valve stems through which air is admitted into the inner tube.

1 Claims, 4 Drawing Figures

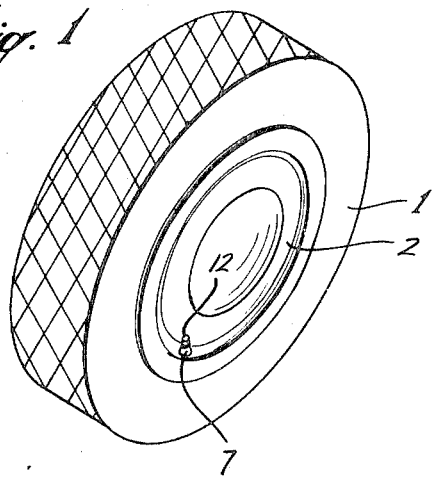
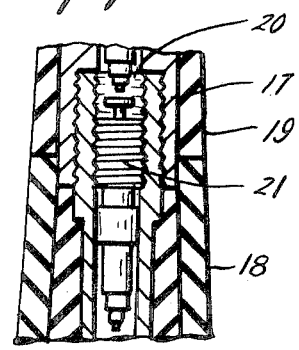
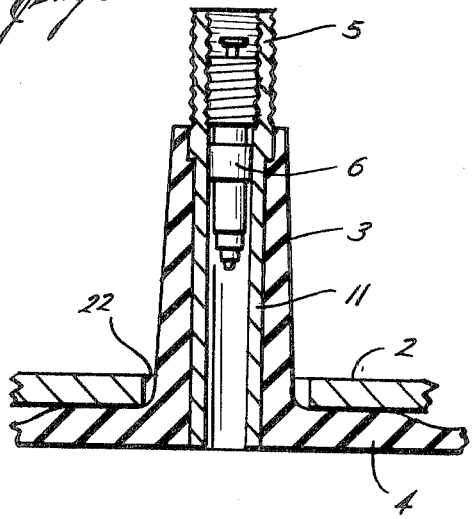
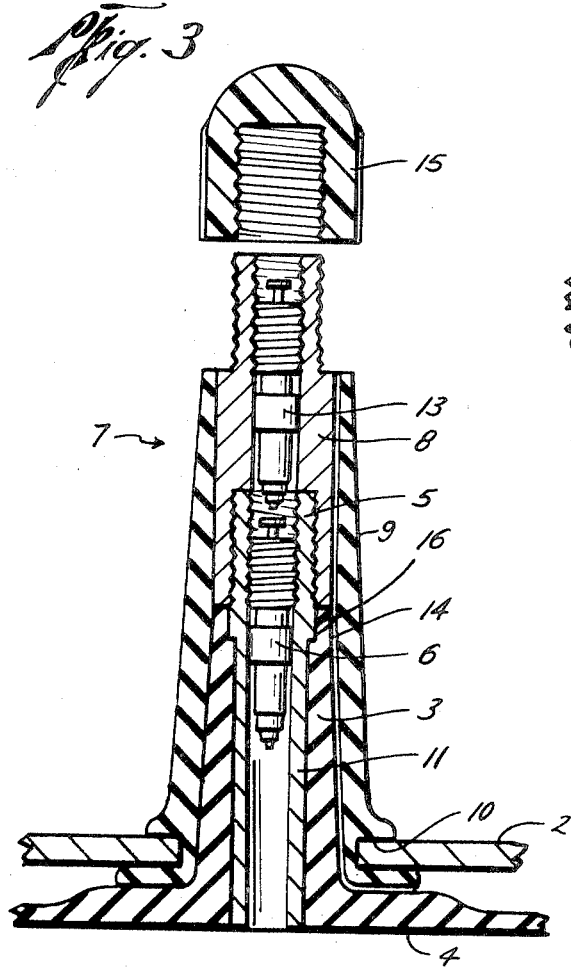

AUTOMOBILE TIRE VALVE ADAPTER

SUMMARY OF THE INVENTION

An automobile tire valve adapter for use on automobile tires to permit use of an inner tube in the tire to permit easy patching of punctures and less strain on the casing in the event of a puncture, and to retain the benefits of a tubeless tire by providing means for preventing escape of air from the casing in the event of rupture of the inner tube.

BRIEF DESCRIPTION OF THE DRAWINGS

FIG. 1 is a perspective view of a tire having the tire valve adapter mounted thereon.

FIG. 2 is an elevational cross-sectional view of a valve and inner tube, without the adapter.

FIG. 3 is an elevational cross-sectional view of the valve and adapter, and

FIG. 4 is a cross-sectional, partial view of a modification of the device.

DESCRIPTION OF THE PREFERRED EMBODIMENT

In the drawings, the numeral 1 designates a tire casing, such as found on a passenger automobile, mounted on the usual rim 2. The stem 3 is an integral part of the inner tube 4 and has the conventional valve core seat 5 and the valve core 6, in the rigid axial passageway 11 through the stem.

The inner surface of the stem 5 is threaded, adjacent its upper end, to receive the valve core 6, and is externally threaded to receive the internal threads of the enlarged chamber 16 in the outer stem 7. The outer stem has the rigid member 8 and the integral resilient outer cover 9, the cover 9 having the peripheral groove 10 adjacent one end thereof which receives the peripheral margin of the valve stem orifice 22 in the wheel 2. The rigid member 8 is reduced at its upper end, the reduced portion being externally threaded to receive the conventional valve cap 15. A valve core 13 is mounted in the member 8 and a groove 14 is formed in the inside wall of the outer cover 9 which permits bleeding of air from the casing when the tube is inflated, and which is sealed when the cap 15 is mounted on the stem 7.

In assembling the tire, the inner tube 4 is placed in the casing 1 after the adapter 7 has been mounted on the valve stem 3, and the casing mounted on the wheel and the adapter 7 is then pulled through the valve stem orifice 22 until the peripheral groove 10 in the outer cover 9 has engaged the peripheral margin of the valve stem orifice 22. The inner tube 4 may then be inflated by applying air through the valve core 13, and air trapped in the area between the inner tube and the inside wall of the casing 1, will escape through the groove and passageway 14. With the adapter secured to the stem 3 of the inner tube 4, and anchored to the valve stem orifice 10, and the cap 15 mounted on the stem 8, a barrier is formed between the inner tube and wheel adjacent the valve steam, and the air in the casing will be sealed in, and the tire will have all of the advantages of a tubeless tire, but will still have the added security of an inner tube equipped tire.

In the form shown in FIG. 4, the cover 20 over the rigid member 17, is in two pieces, 18, 19. The lower portion 19 having the enlarged chamber 20 which is internally threaded to be mounted on the external threads of the inner tube valve stem 21. In this form, the lower portion of the cover is mounted on the wheel as shown in FIG. 3 and the upper portion of the cover 19 is screwed onto the inner tube valve stem 21. This permits the upper portion of the outer stem to be removed for easy removal of the inner tube for repairs without the necessity of removing the lower portion 19 from the wheel.

What I claim is:

1. In an automobile tire valve adapter for use on valve stems of inner tubes mounted in a tire casing on a vehicle wheel, said wheel having the usual valve stem orifice, said adapter comprising a rigid tubular member having an internally threaded enlarged chamber, an inner tube having a valve stem, said chamber being adapted to be mounted on the external threads of the inner tube valve stem, a flexible cover on said rigid member, said cover extending downwardly therefrom and adapted to fit over the inner tube valve stem, said cover having means adjacent its lower end to seal the casing and said wheel against escape of air from the casing and a valve core mounted in the upper end of said rigid member, said adapter being formed in two parts, the lowermost part being a flexible cover, mounted in the wheel orifice, and the uppermost part consisting of the rigid member, and the cover thereon, the lower end of which abuts the upper end of the lowermost part when the rigid member is mounted on the valve stem of the inner tube.

* * * * *